Aug. 13, 1974 R. C. LAVERTY Re. 28,111
FASTENER WITH IMPROVED THREAD CONSTRUCTION
Original Filed Jan. 4, 1971
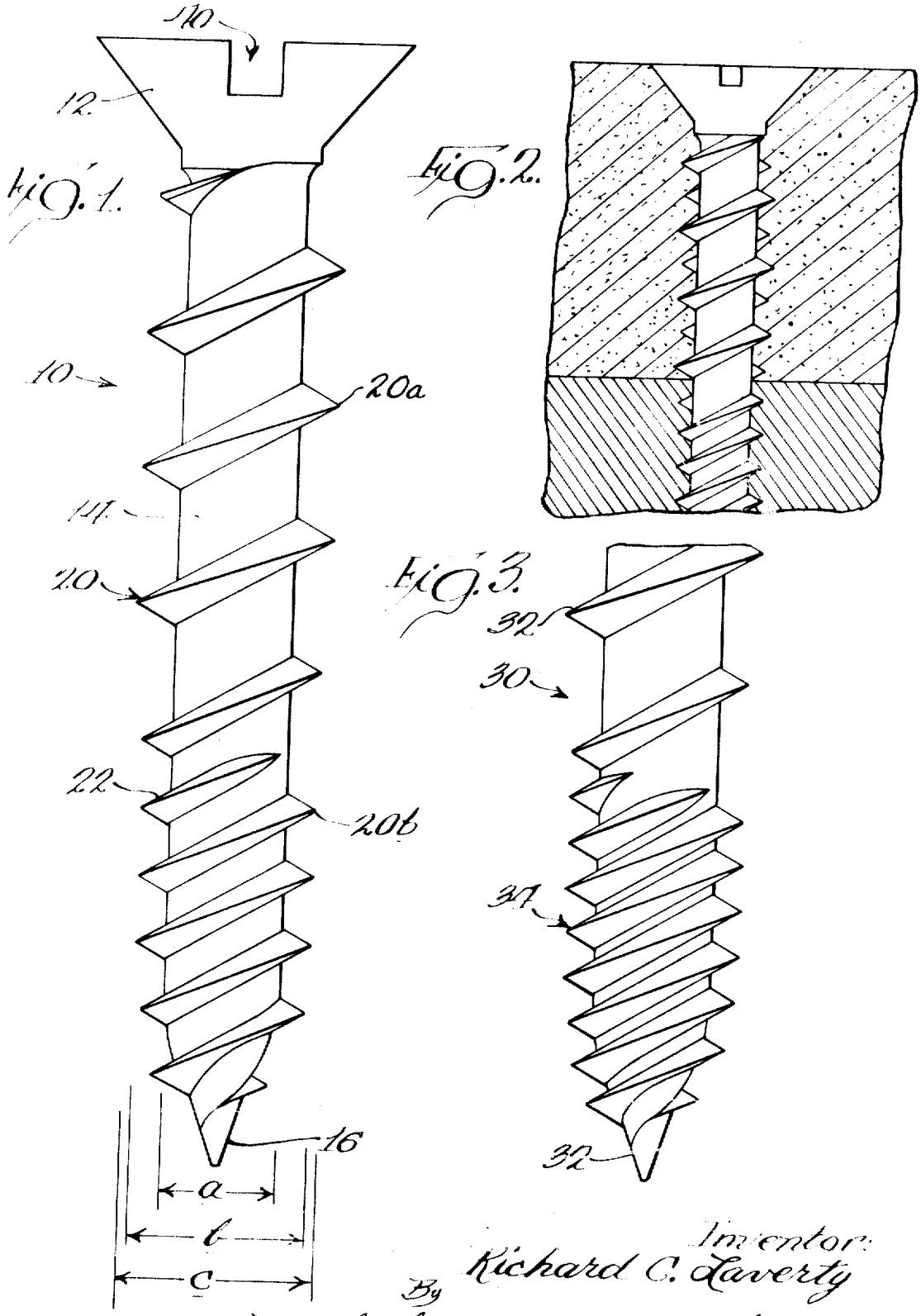
Inventor:
Richard C. Laverty
By
Dressler, Goldsmith, Clement & Gordon
Attys United States Patent Office Re. 28,111
Reissued Aug. 13, 1974

28,111
FASTENER WITH IMPROVED THREAD CONSTRUCTION

Richard C. Laverty, Palatine, Ill., assignor to MSL Industries, Inc.

Original No. 3,703,843, dated Nov. 28, 1972, Ser. No. 103,637, Jan. 4, 1971. Application for reissue Dec. 4, 1973, Ser. No. 421,549
Int. Cl. F16b *25/00, 39/30*
U.S. Cl. 85—46 9 Claims

Matter enclosed in heavy brackets [ ] appears in the original patent but forms no part of this reissue specification; matter printed in italics indicates the additions made by reissue.

ABSTRACT OF THE DISCLOSURE

A fastener having a shank divided into first and second portions respectively located adjacent a head end and a tapered pointed end with the first portion having a single thread formed thereon of uniform pitch. A multiple of parallel threads of similar uniform pitch are formed on the second portion of the shank and one of the threads on the second portion is a continuation of the thread on the first portion. All of the threads have a substantially uniform minor diameter while the major diameter of the upper single thread portion is greater than the major diameter of the lower multiple thread portion.

BACKGROUND OF THE INVENTION

The present invention relates generally to threaded fasteners and more particularly to an improved fastener for use with materials, such as particle board.

In recent years, the increased cost in natural wood, plaster and various other building materials heretofore utilized has required the construction industry to look to other types of materials to reduce the cost of buildings. Thus, the use of dry wall Gypsum board in place of the conventional plaster in buildings has been rather extensive. In addition, particle board, masonite, etc., are being used as building materials.

While the substitute materials for the heretofore known types of building materials have found a remarkable degree of commercial success, difficulties have been encountered in providing a secure connection between the above mentioned materials and supporting structure. In various uses, the Gypsum board, particle board, masonite, etc. are secured to a supporting structure, such as a wood or metal base, by the use of self-tapping screws that form their own openings.

Because of the tendency for the above mentioned materials to disintegrate under the pressure of the screw threads, difficulties have been encountered in obtaining the necessary holding power between such materials and supporting structure, such as metal.

SUMMARY OF THE INVENTION

The present invention contemplates a self-tapping screw which is capable of forming its own opening and produces easy initial entry and greater holding power after the screw has been fully inserted into the structure. The screw has a first multiple thread portion which accommodates easy initial entry into a work-piece and partially forms threads in the more dense material. Thereafter, a second portion of the screw enlarges one of the multiple threads in the workpiece while the multiple thread portions provide easy entry into the supporting structure. All of the above is accomplished by a simple and inexpensive screw which can easily be deformed by utilizing conventional roll thread dies to deform a circular shank of uniform diameter.

The fastener element of the present invention includes a shank having a head upon end and a tapered point on the opposite end and the shank divided into first and second portions respectively located adjacent the opposite ends. A continuous thread of uniform pitch is produced on the shank and extends between the opposite ends *and onto the tapered point.* At least one additional parallel thread of similar uniform pitch is formed on the second portion of the shank to produce multiple parallel threads along the lower portion of the shank and a single thread along the upper portion of the shank, that is a continuation of one of the multiple parallel threads.

All of the threads on both portions of the shank have a substantially uniform minor diameter while the single continuous thread on the upper portion has a larger major diameter than the major diameter of the lower twin threaded portion.

With this arrangement, the lower portion of multiple threaded portion initially forms a multiple thread in an opening which is produced by the screw as it enters the workpiece, such as a particle board. Thereafter, the single threaded portion, which has a thread formed as a continuation of one of the multiple threads on the lower portion, increases the major diameter of one of the multiple threads since it has a greater major diameter.

The single threaded portion has considerably more spacing between adjacent thread portions thereby requiring less deformation of the particle board. However, because of the larger major diameter of the thread in the upper portion and the common minor diameter of all of the threads on the shank, increased holding power will result from such a thread construction.

In one specific embodiment, the multiple thread portion utilizes a twin parallel thread while an alternate embodiment utilizes a triple parallel thread on the lower portion of the screw. In each embodiment, the single thread on the upper portion of the screw is a continuation of one of the lower threads.

BRIEF DESCRIPTION OF SEVERAL VIEWS OF DRAWINGS

FIG. 1 is a side elevation of a screw constructed in accordance with the present teachings;

FIG. 2 is a fragmentary sectional view showing the screw retaining a workpiece on a supporting structure; and FIG. 3 is a fragmentary side elevation similar to FIG. 1 showing a slightly modified form of the invention.

DETAILED DESCRIPTION

While this invention is susceptible of embodiment in many different forms there is shown in the drawings and will herein be described in detail one specific embodiment, with the understanding that the present disclosure is to be considered as an exemplification of the principles of the invention and is not intended to limit the invention to the embodiment illustrated.

Referring to the drawings, FIG. 1 shows a screw 10 having an enlarged head 12 on one end of a shank 14 and a tapered point 16 adjacent the opposite end of the shank. The shank 14 is threaded in accordance with the teachings of the present invention and includes a continuous thread 20 extending between the head end 12 and the tapered pointed end 16. The thread 20 has a first portion 20a on the upper end of the screw adjacent the head 12 and a second portion 20b adjacent the tapered point or second portion of the shank. An inspection of FIG. 1 reveals that the thread portions 20a and 20b, respectively defined on the first and second portions of the shank 14 have a common substantially uniform minor diameter a, *except for the part of thread portion 20b which is on the tapered point 16,* while the first or upper thread portion 20a has a greater major diameter c than the major diameter b of the second or lower thread portion 20b. Also, each portion has a plurality of thread convolutions as is shown in FIG. 1.

In addition, the lower or second portion of the shank 14 of the screw 10 has a second parallel thread 22 that has a similar uniform pitch and is located between or intermediate the continuous thread portion 20b. The two threads 20b and 22 cooperate to define parallel twin threads along the lower or second portion of the shank and the thread portion 20a defines a single thread along the upper or first portion of the shank that is a continuation of one of the double or twin parallel threads.

The screw 10 of the present invention is formed by utilizing a blank having a uniform diameter which is deformed by rolling to produce the finished screw. Since the same amount of metal is deformed along the entire length of the shank and the minor diameter of the [thread] *threads, except at the point 16,* is substantially uniform along the length of the shank, the major diameter of the single threaded portion is larger than the major diameter of the double or multiple threaded portion adjacent the pointed end.

When inserting the screw through a workpiece, such as a particle board or Gypsum board, and attaching the workpiece to a support, such as a metal stud, the double thread portion provides easy entry into the material to form the hole and the double or multiple thread portion allows the screw to be inserted with a minimum amount of torque being applied thereto. As the double threaded portion is inserted past the upper surface of the workpiece, the single threaded portion enlarges the major diameter of one of the multiple threads formed in the workpiece while the thread portion begins its travel into the support to produce a multiple threaded opening in the support.

The larger pitch or wider spacing between respective turns of the thread on the upper portion having a larger major diameter results in a deepening of one of the double threads in the workpiece to further compact the interior of the workpiece and the substantial increment between the major and minor diameters of the thread produces considerably greater holding power after the screw is in its fully inserted position, shown in FIG. 2. Since only one of the double threads initially formed in the workpiece is enlarged, the higher degree of holding power is achieved without removing or disintegrating the material between respective helixes of the upper thread.

Thus, it will be seen that the present invention provides a simple and efficient manner for increasing the holding power of a screw, particularly used for connecting a workpiece to a support and wherein the workpiece and the support are formed of different materials. The double threaded portion on the lower end of the screw provides for easy, rapid screw entry through the Gypsum board and the metal stud, while the upper single threaded portion attains a higher degree of holding power without disintegrating the material adjacent the opening.

A slightly modified form of the present invention is shown in FIG. 3, in which a shank 30 having a head (not shown) on one end thereof and a pointed tip 32 on the opposite end thereof, is provided with a single threaded portion 32 along the upper portion of the screw and a triple threaded portion 34 along the lower portion of the screw with one of the triple threads being a continuation of the single thread along the upper portion. Again, the major diameter of the single thread along the upper portion of the shank is greater than the major diameter along the lower multiple thread defined on the lower portion of the shank while the minor diameters of the two threads are the same.

In the modified embodiment of the invention, the threads are again produced by rolling a uniform, diameter shank and the increment between the major diameters b and c, is larger than the increment between these diameters in the FIG. 1 embodiment.

Various other modifications will come to mind without departing from the spirit of the present invention. For example, any multiple of threads could be used for the lower portion of the screw so long as one of the parallel threads continues into the upper portion and has a larger major diameter along the upper portion of the shank. In addition, while the head 12 has been shown as being of the flat type, having a kerf 40 for receiving a driving element, such as a screwdriver, various heads, such as the oval head, round head, pan head and Fillister head could be substituted without departing the spirit of the invention. In addition, the screw need not necessarily have a tapered point adjacent the opposite end thereof. However, in its specific embodiment, the screw is preferably of the tapered point type with the thread extending down to the point so that the screw will form its own hole and need not have a pre-drilled hole formed in the workpiece and/or the support.

I claim:

1. A fastening element including a shank with a head on one end and a tapered point on the opposite end, said shank being divided into first and second portions; a continuous thread of uniform pitch on said shank extending substantially between said ends with said portions each having a plurality of thread convolutions; and at least one additional parallel thread of similar uniform pitch intermediate said continuous thread only on said second portion of said shank, said threads having a common minor diameter throughout the length of both portions, said continuous thread having a major diameter on said first portion which is greater than the major diameter of said threads on said second portion, and the major diameters of said threads on said second portion being substantially uniform.

2. A fastener element as defined in claim 1, in which said second portion has a double thread and said first portion has a single thread.

3. A fastener as defined in claim 1, in which said second portion has a triple thread and said first portion has a single thread.

4. A fastener element as defined in claim 1, in which said second portion is located adjacent said tapered point and said first portion is located adjacent said head.

*5. A fastener element as defined in claim 4, a thread on said shank extending onto said tapered point.*

*6. A fastener element as defined in claim 1, a thread on said shank extending onto said tapered point.*

*7. A fastening element including a shank with a head on one end and a tapered point on the opposite end, said shank being divided into first and second portions; a continuous thread of uniform pitch on said shank extending substantially between said ends with said portions each having a plurality of thread convolutions; and at least one additional parallel thread of similar uniform pitch intermediate said continuous thread only on said second portion of said shank, said continuous thread having a major diameter on said first portion which is greater than the major diameter of said threads on said second portion, and the major diameters of said threads on said second portion being substantially uinform.*

*8. A fastener element as defined in claim 7, a thread on said shank extending onto said tapered point.*

*9. A fastener as in claim 7, said threads having their minor diameter on the said shank.*

References Cited

The following references, cited by the Examiner, are of record in the patented file of this patent or the original patent.

UNITED STATES PATENTS

| | | | |
|---|---|---|---|
| Re. 3,941 | 4/1870 | Pierce | 85—46 |
| 408,531 | 8/1889 | Rogers | 85—46 |
| 438,754 | 10/1890 | Rogers | 85—46 |
| 1,809,758 | 6/1931 | Rosenberg | 85—46 X |
| 1,980,093 | 11/1934 | Rosenberg | 85—46 |

RAMON S. BRITTS, Primary Examiner